(12) United States Patent
Chuang

(10) Patent No.: US 6,806,868 B2
(45) Date of Patent: Oct. 19, 2004

(54) MULTI-FUNCTION TOUCH PEN FOR COMPUTERIZED APPARATUS

(75) Inventor: Wei-Pin Chuang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 214 days.

(21) Appl. No.: 10/033,803

(22) Filed: Jan. 3, 2002

(65) Prior Publication Data

US 2003/0122803 A1 Jul. 3, 2003

(51) Int. Cl.⁷ .................................................. G09G 5/00
(52) U.S. Cl. ..................... 345/179; 345/173; 178/18.01
(58) Field of Search ................................. 345/156–158, 345/164, 166, 169, 170, 172–177, 179, 180, 182, 183; 179/18.01–18.11, 19.01–19.05

(56) References Cited

U.S. PATENT DOCUMENTS

| | | | | |
|---|---|---|---|---|
| 5,226,091 A | * | 7/1993 | Howell et al. ............... 382/107 |
| 5,294,792 A | * | 3/1994 | Lewis et al. ................. 250/221 |
| 5,581,783 A | * | 12/1996 | Ohashi ........................... 710/5 |
| 6,188,392 B1 | * | 2/2001 | O'Connor et al. ........... 345/179 |
| 6,307,956 B1 | * | 10/2001 | Black .......................... 382/124 |
| 6,450,721 B1 | * | 9/2002 | D'Amico et al. ............ 401/258 |
| 6,486,875 B1 | * | 11/2002 | O'Donnell, Jr. ............. 345/179 |
| 6,529,189 B1 | * | 3/2003 | Colgan et al. ............... 345/179 |
| 2003/0085883 A1 | * | 5/2003 | Wu .............................. 345/179 |

* cited by examiner

Primary Examiner—Bipin Shalwala
Assistant Examiner—Mansour M. Said
(74) Attorney, Agent, or Firm—Foley & Lardner LLP

(57) ABSTRACT

A multi-function touch pen includes a pen barrel having a first barrel end portion formed as a touch tip adapted for operating a touch control panel of a computerized apparatus. An electronic device includes an input unit mounted on the pen barrel and operable so as to generate an input signal, a processor disposed in the pen barrel, coupled electrically to the input unit and operable so as to process the input signal, and an output unit mounted on the pen barrel and coupled electrically to and controlled by the processor for generating an output corresponding to the input signal.

17 Claims, 5 Drawing Sheets

MULTI-FUNCTION TOUCH PEN FOR COMPUTERIZED APPARATUS

BACKGROUND OF THE INVENTION

1. Field of the Invention

The invention relates to a multi-function touch pen for a computerized apparatus.

2. Description of the Related Art

A conventional touch pen for use with a computerized apparatus having a touch control panel, such as a palm computer or a personal digital assistant, generally has only a single function. It is desirable to provide the touch pen with additional functions so as to enhance product competitiveness.

SUMMARY OF THE INVENTION

Therefore, the object of the present invention is to provide a multi-function touch pen.

According to the present invention, a multi-function touch pen is adapted for use with a computerized apparatus with a touch control panel. The touch pen comprises:

a pen barrel having first and second barrel end portions opposite to each other, the first barrel end portion being formed as a touch tip adapted for operating the touch control panel; and an electronic device including an input unit mounted on the pen barrel and operable so as to generate an input signal, a processor disposed in the pen barrel and coupled electrically to the input unit, the processor being operable so as to process the input signal, and an output unit mounted on the pen barrel and coupled electrically to and controlled by the processor for generating an output corresponding to the input signal.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
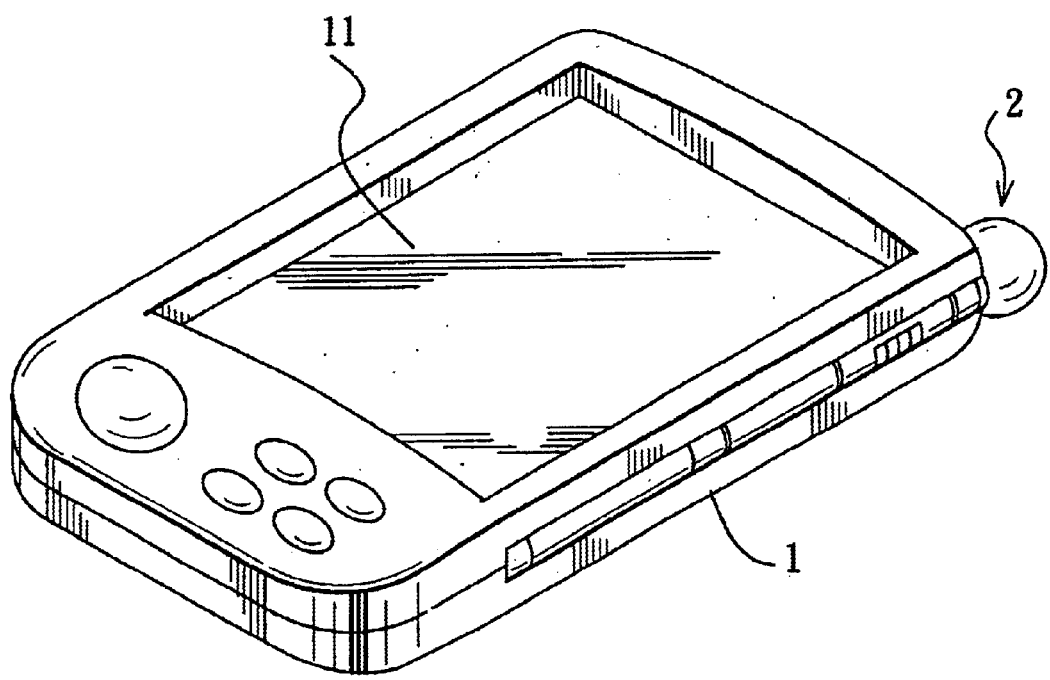
FIG. 1 is a perspective view showing a computerized apparatus with the first preferred embodiment of a multi-function touch pen according to the present invention.
Figure 2:
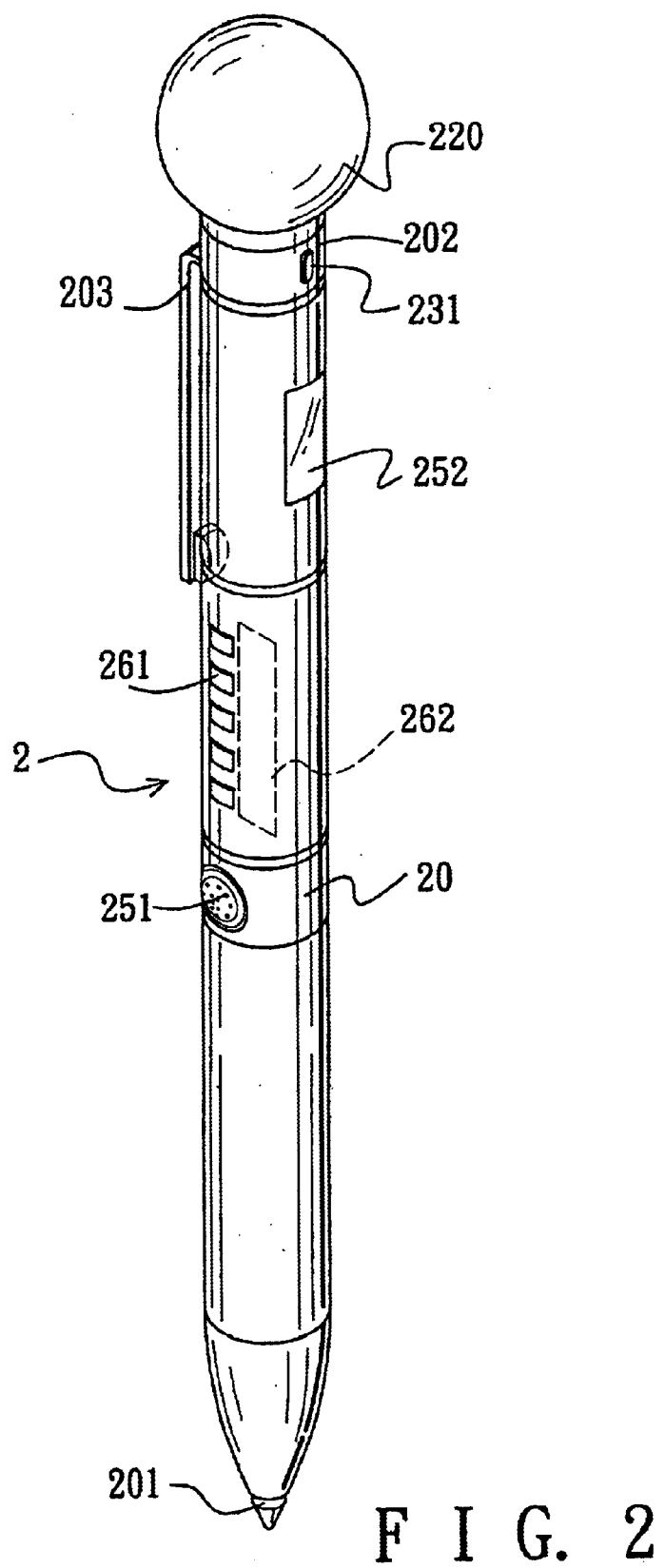
FIG. 2 is a perspective view showing the first preferred embodiment.
Figure 3:
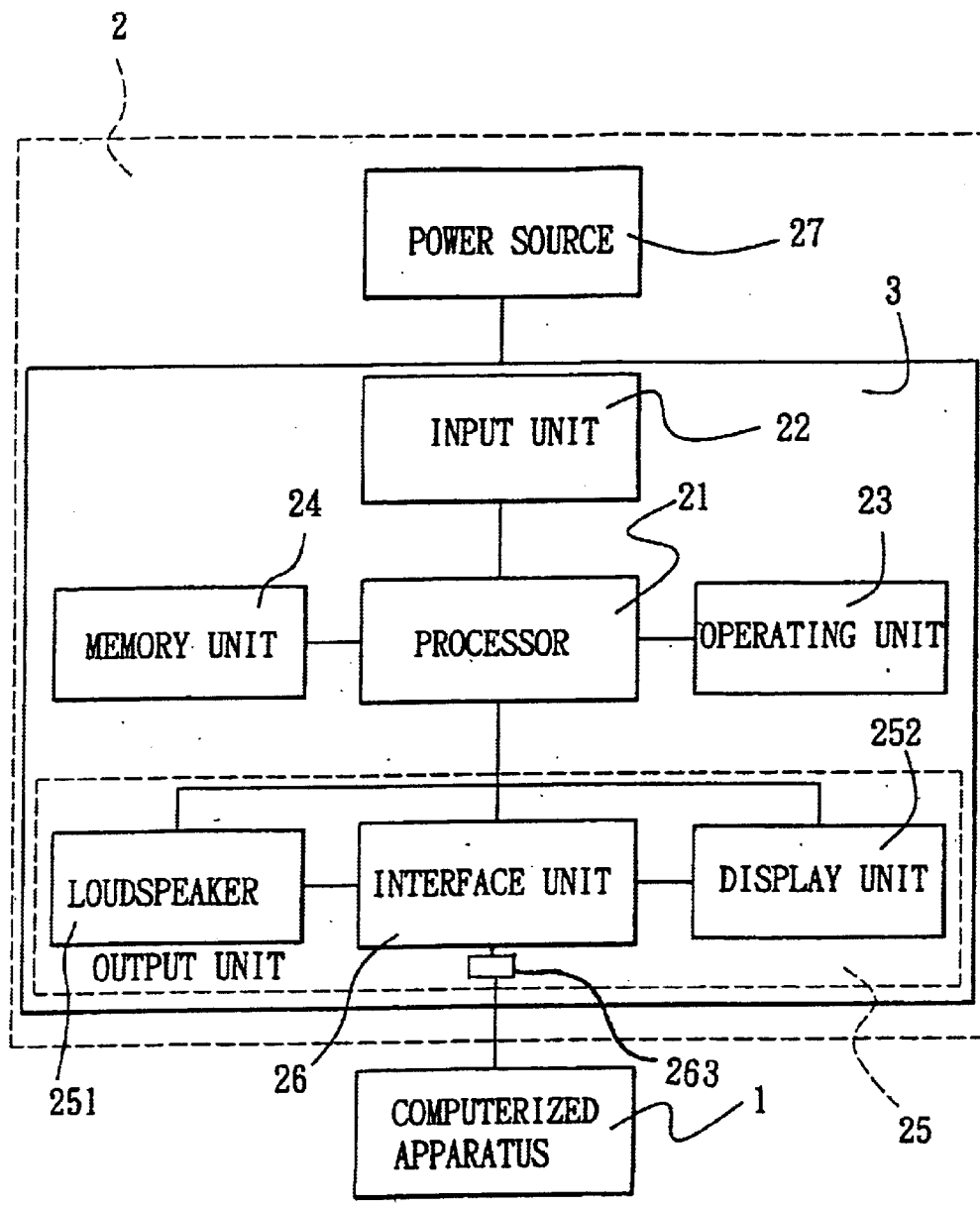
FIG. 3 is a schematic circuit block diagram illustrating the preferred embodiment.

Referring to FIGS. 1 to 3, the first preferred embodiment of a multi-function touch pen 2 according to the present invention is shown to be adapted for use with a computerized apparatus 1, such as a personal digital assistant, a handheld computer or a palm computer, with a touch control panel 11. In this embodiment, the computerized apparatus 1 is exemplified using a personal digital assistant. The touch pen 2 is adapted to be mounted removably on the computerized apparatus 1. The touch pen 2 includes a pen barrel 20 and an electronic device 3.

The pen barrel 20 has first and second barrel end portions 201, 202 opposite to each other. The first barrel end portion 201 is formed as a touch tip adapted for operating the touch control panel 11.

In this embodiment, the electronic device 3 can provide a recording function, and includes an input unit 22, a processor 21, an output unit 25, a memory unit 24, and an operating unit 23.

The input unit 22 is mounted on the pen barrel 20 and is operable so as to generate an input signal. In this embodiment, the input unit 22 includes a sound pick-up unit 220 that is mounted on the second barrel end portion 202 of the pen barrel 20. The input signal is thus an audio input signal.

The processor 21 is disposed in the pen barrel and is coupled electrically to the input unit 22. The processor 21 is operable so as to process the input signal.

The memory unit 24 is disposed in the pen barrel 20 and is coupled electrically to the processor 21. The memory unit 24 is controlled by the processor 21 to store the input signal from the input unit 22 therein.

The operating unit 23 is mounted on the pen barrel 20 and is coupled electrically to the processor unit 21. The operating unit 23 is operable so as to control storage and retrieval of the input signal in and from the memory unit 24 by the processor 21. In this embodiment, the operating unit 23 includes an operating key 231 (see FIG. 2). The operating key 231 is operable so as to generate a control signal, such as an activate signal, a terminate signal, a play signal, a transmission signal, etc. It is noted that the operating unit 23 can also be a voice recognition device or a touch control device.

The output unit 25 is mounted on the pen barrel 20 and is coupled electrically to and controlled by the processor 21 for generating an output corresponding to the input signal. In this embodiment, the output unit 25 includes a loudspeaker 251, the output thereof being an audio signal. The output unit 25 further includes a display unit 252, which is mounted on the pen barrel 20, coupled electrically to and controlled by the processor 21 to display a code corresponding to a segment of the memory unit 24 being accessed by the processor 21. The output unit 25 further includes an interface unit 26 adapted to establish a communications link with the computerized apparatus 1 for transmitting the output to the computerized apparatus 1. The interface unit 26 includes a set of electrical contacts 261 (see FIG. 2). Alternatively, the interface unit 26 can include a wireless transceiver 262 that is adapted to establish a wireless communications link 263 with the computerized apparatus 1. The wireless communications link can be an infrared communications link or one that complies with the Bluetooth communications standard.

The touch pen 2 further includes a power source 27 mounted in the pen barrel 20. The power source 27 is coupled electrically to the electronic device 3 for supplying electric power thereto.

Figure 4:
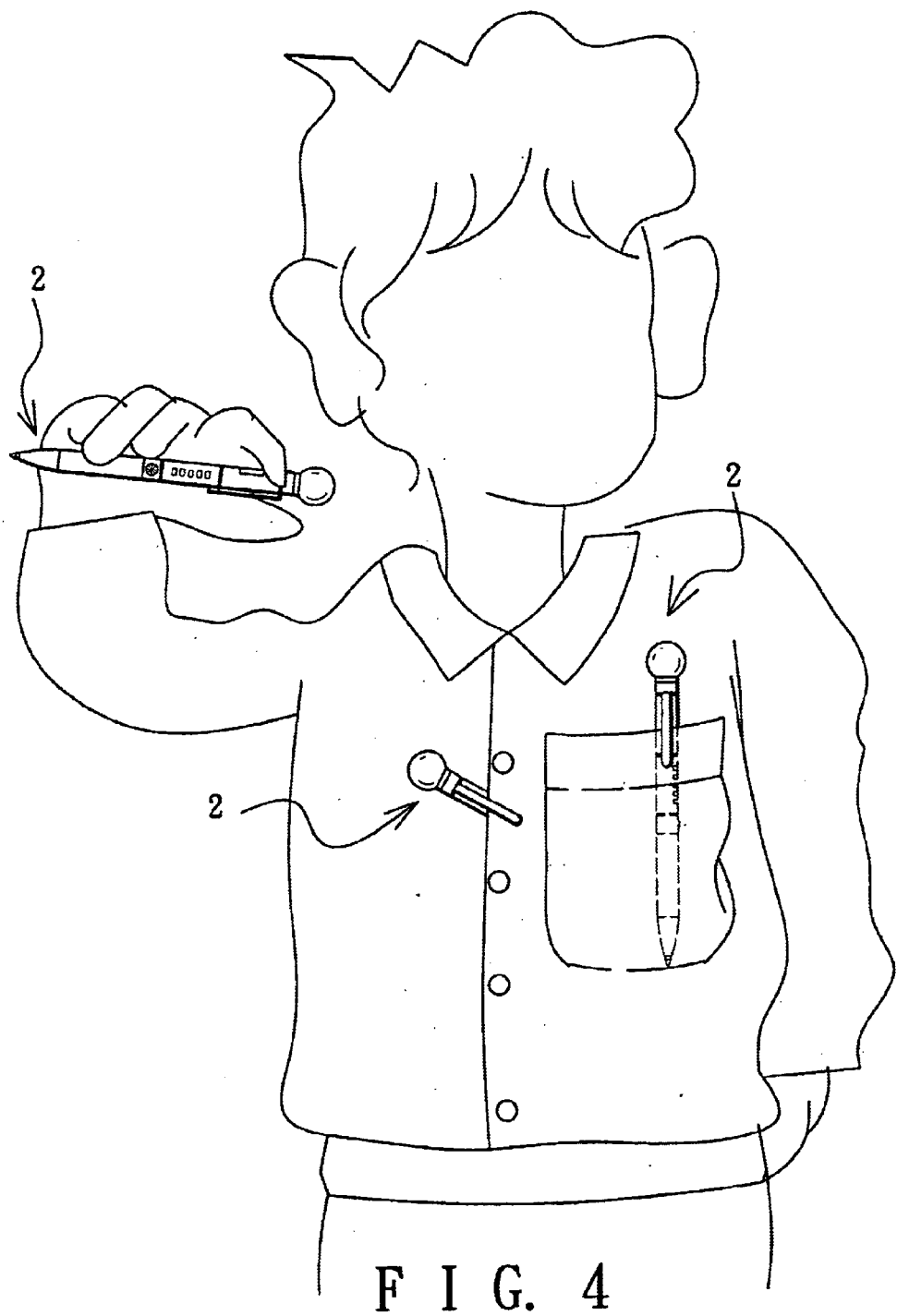
FIG. 4 is a schematic view showing the first preferred embodiment in a state of use.

Furthermore, the pen barrel 20 is provided with a clip 203 so as to permit clipping of the touch pen 2 on the user's clothing, as shown in FIG. 4.

Figure 5:
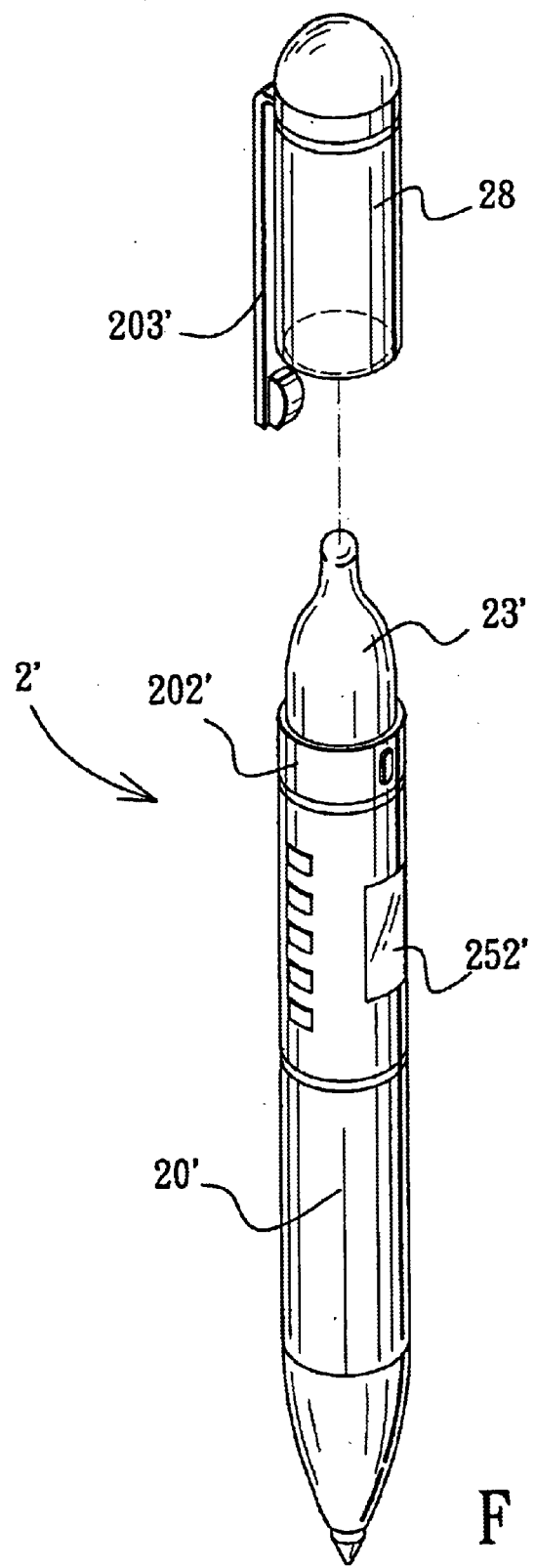
FIG. 5 is a perspective view showing the second preferred embodiment of a multi-function touch pen for a computerized apparatus according to the present invention.

FIG. 5 illustrates the second preferred embodiment of a multi-function touch pen 2' for a computerized apparatus according to the present invention, which is a modification of the first preferred embodiment. Unlike the previous embodiment, the electronic device serves as a digital thermometer. In this embodiment, the input unit includes a temperature sensor 23' that is mounted on the second barrel end portion 202' of the pen barrel 20'. The input signal is thus a temperature input signal. The output unit includes a display unit 252'. The output generated by the output unit is a visual reading corresponding to the temperature input signal. The touch pen 2' further includes a pen cap 28 with the clip 203' mounted removably on the second barrel end portion 202' of the pen barrel 20' so as to protect the temperature sensor 203'.

In view of the electronic device of the touch pen of the present invention, functions other than recording and temperature measuring can also be incorporated into the touch pen.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A multi-function touch pen for a computerized apparatus with a touch control panel, said touch pen comprising:
   a pen barrel having first and second barrel end portions opposite to each other, said first barrel end portion being formed as a touch tip adapted for operating the touch control panel; and
   an electronic device including
      an input unit mounted on said pen barrel and operable so as to generate an input signal,
      a processor disposed in said pen barrel and coupled electrically to said input unit, said processor being operable so as to process the input signal, and
      an output unit mounted on said pen barrel and coupled electrically to and controlled by said processor for generating an output corresponding to the input signal,
      a memory unit disposed in said pen barrel and coupled electrically to said processor, said memory unit being controlled by said processor to store the input signal from said input unit therein, and
      an operating unit mounted on said pen barrel and coupled electrically to said processor, said operating unit being operable so as to control storage and retrieval of the input signal in and from said memory unit by said processor.

2. The multi-function touch pen as claimed in claim 1, wherein said input unit includes a sound pick-up unit, the input signal being an audio input signal.

3. The multi-function touch pen as claimed in claim 2, wherein said input unit is mounted on said second barrel end portion.

4. The multi-function touch pen as claimed in claim 2, wherein said output unit includes a loudspeaker, the output generated by said output unit being an audio output.

5. The multi-function touch pen as claimed in claim 1, wherein said operating unit includes at least one operating key.

6. The multi-function touch pen as claimed in claim 1, wherein said output unit includes a display unit mounted on said pen barrel and coupled electrically to and controlled by said processor to display a code corresponding to a segment of said memory unit being accessed by said processor.

7. The multi-function touch pen as claimed in claim 1, further comprising a power source mounted in said pen barrel and coupled electrically to said electronic device.

8. The multi-function touch pen as claimed in claim 1, wherein said output unit includes an interface unit adapted to establish a communications link with the computerized apparatus for transmitting the output to the computerized apparatus.

9. The multi-function touch pen as claimed in claim 8, wherein said interface unit includes a set of electrical contacts.

10. The multi-function touch pen as claimed in claim 8, wherein said interface unit is adapted to establish a wireless communications link with the computerized apparatus.

11. The multi-function touch pen as claimed in claim 10, wherein the wireless communications link is an infrared communications link.

12. The multi-function touch pen as claimed in claim 10, wherein the wireless communications link complies with the Bluetooth communications standard.

13. The multi-function touch pen as claimed in claim 1, wherein said pen barrel is provided with a clip.

14. The multi-function touch pen as claimed in claim 1, wherein said input unit includes a temperature sensor, the input signal being a temperature input signal.

15. The multi-function touch pen as claimed in claim 14, wherein said temperature sensor is mounted on said second barrel end portion.

16. The multi-function touch pen as claimed in claim 15, further comprising a pen cap mounted removably on said second barrel end portion.

17. The multi-function touch pen as claimed in claim 14, wherein said output unit includes a display unit, the output generated by said output unit being a visual reading corresponding to the temperature input signal.

* * * * *